United States Patent Office 2,830,907
Patented Apr. 15, 1958

2,830,907

PROCESS FOR IMPROVING THE COLOR OF ANIMAL MATERIAL

Alfred L. Savich, Chicago, and Clarence E. Jansen, Palos Heights, Ill., assignors to Swift & Company, Chicago, Ill., a corporation of Illinois No Drawing. Application July 13, 1954
Serial No. 443,158

10 Claims. (Cl. 99—107)

This invention pertains to an improvement in the processing of animal materials to obtain a more desirable color and a color that is stabilized for a period of time formerly unobtainable.

For some time it has been known that ascorbic acid could be used to stabilize the desirable bright red color commonly associated with fresh meat and to reinforce the vitamin content of the meat. However, ascorbic acid and its edible salts and esters are ineffective in the color protection of meat stored at conventional refrigeration temperatures for periods longer than four to five days.

Meat contains a number of chromoproteins which are the oxygen-bearing pigments of the blood. Among these chromoproteins are myoglobin and hemoglobin which are the reduced forms of their respective pigments. Upon oxygenation, myoglobin and hemoglobin, which are purplish red, become bright red and are termed, respectively, oxymyoglobin and oxyhemoglobin. Oxidation of myoglobin and hemoglobin results in metmyoglobin and methemoglobin which are an objectionable grayish brown in color. It is known that ascorbic acid acts as a reducing agent toward these grayish brown met compounds and converts them, respectively, to myoglobin and hemoglobin. The reduced pigments then take up oxygen from the air to give the desired bright red oxy compounds.

We have found that propionic acid and its edible salts and esters may be substituted for ascorbic acid in the color protection of meat. In the preferred embodiment of the invention, we use a minor amount of propionate together with a small amount of ascorbic acid. Such treatment will stabilize the color for a period of time beyond that which is possible with the addition of the ascorbic acid alone, or through the use of the propionate alone. There appears to be a synergistic effect when the two compounds are used in combination, inasmuch as the period of color protection obtained is greater than what would be expected through the combined use.

We may use a monobasic alkaline earth phosphate, along with the propionate and ascorbic acid, in the practice of the process of our invention to further extend the color life. The addition of the phosphate permits the use of smaller amounts of the propionate which is sometimes desirable as the higher levels of the propionate may give an off-flavor which is objectionable to some people.

Very satisfactory results have been obtained where ascorbic acid was used at the level of 0.05 percent, sodium propionate in the amount of 0.05 percent, and sodium phosphate monobasic at a level of 0.2 percent, all based on the weight of the meat being treated. The meat so treated and stored at 35° F. had a satisfactory color through a period of 9 days. By the 12th day the sample had gone somewhat off-color. The untreated control from the same batch of ground meat had an unacceptable color by the end of the second day of storage.

Varying concentrations of the ascorbic acid and propionate may be employed depending upon the particular meat being processed and its form. It is known that concentrations of ascorbic acid within the range of 0.01–0.1 percent based on the weight of the meat being treated give satisfactory results. Concentrations less than 0.01 percent may be used but with decreasing returns. The use of the propionate much in excess of 0.5 percent is not recommended as such amounts may give an objectionable off-flavor. We prefer to use the propionate within the range of 0.05–0.1 percent and less, together with a minor amount of the monobasic alkaline earth phosphate. The most satisfactory results were realized with the use of 0.05 percent of the propionate.

In the treatment of meat cuts or whole carcasses, dusting may be employed in distributing the ascorbic acid and the other compounds over the surface of the meat being treated. The amount of treated material required varies with the effective distribution of the material. Where ground meat is being processed we prefer to incorporate the additives in an aqueous solution which is thoroughly mixed with the ground meat.

The following examples illustrate the effectiveness of our method of processing and the advantages to be gained in the application of it. The color evaluations are those of a color panel made up of three individuals whose scores were averaged to give the ratings shown. A scale reading of 8 or better is considered good. 7 is a border line color, and all scale readings below 7 are considered unacceptable to the average consumer of meat. In each of the examples fresh beef trimmings were first coarse-ground through a three-quarter inch plate and then the additives in an aqueous solution were incorporated in the ground meat. The meat was next subjected to a fine grind through an eighth-inch plate, then packaged in cellophane and refrigerated immediately thereafter at a temperature maintained within the range of 33°–37° F.

In each of the first four examples the propionate treated sample (which in some instances is used in combination with ascorbic acid) is compared to an untreated control (to which neither a propionate nor ascorbic acid was added) and to a sample treated solely with ascorbic acid at a level of 0.05 percent based on the weight of the ground meat. By the end of the third day the untreated control had an unacceptable color of 6. The ascorbic acid treated sample had a color rating of 9 at the conclusion of the third day and retained a rating of 7 through the fourth day, but by the sixth day had faded to a rating of 3. The ground beef before the incorporation of the various additives had an initial color rating of 9. In each instance the additive was added in a 2 percent aqueous solution based on the weight of the meat.

*Example I*

To 3 portions of the ground beef, sodium propionate was added in the concentrations of 0.1 percent, 0.5 percent, and 1.0 percent. The sample to which the sodium propionate had been incorporated in the amount of 0.1 percent had a color rating of 9 at the conclusion of the third day, but by the fourth day had slightly gone off-color to a rating of 7. The same sample had a rating of 6+ on the sixth day and by the tenth day had gone completely off-color to a rating of 4. The sample having 0.5 percent propionate also had a rating of 9 on the third day and at the conclusion of the sixth day a rating of 7. This sample on the tenth day had a rating of 3. The sample incorporating 1.0 percent sodium propionate had the same color rating as the 0.5 percent sample throughout the test period. It will be noted that each of the propionate treated samples compared favorably with the ascorbic acid treated sample described above and were far superior to the untreated control.

*Example II*

To 3 other samples of the same batch of ground beef, ascorbic acid was added at the level of 0.05 percent, and sodium propionate at the respective levels of 0.01 percent, 0.5 percent, and 1.0 percent. The sample containing 0.01 percent propionate retained a color rating of 9 through the fourth day and on the sixth day had a rating of 8. By the end of the tenth day this sample had faded to a rating of 4. The other two samples in which the propionate had been incorporated at higher levels both had a color rating of 9 through the sixth day and faded slightly to a rating of 8 by the conclusion of the eleventh day. In comparison with Example I it will be seen that the color protection available through the combined use of the propionate and ascorbic acid greatly exceeds that obtainable by the addition of the ascorbic acid alone or of the propionate alone. The advantage to be gained, it will be noted, is more than an additive result.

Example III

Two samples of ground meat described above were treated respectively with 0.5 and 0.1 percent of calcium propionate. The sample having the lower level of the propionate had a color rating of 8 on the fifth day, which rating dropped to 7 on the seventh day. From the latter color rating the meat faded to a rating of 5 on the 13th day. The sample incorporating 1.0 percent calcium propionate had a rating of 8 on the seventh day and thereafter faded to a color rating of 5 by the eleventh day. The color panel gave the sample a rating of 4 on the thirteenth day.

Example IV

In this example, 3 portions of the ground beef were treated with 0.05 percent ascorbic acid and 3 varying levels of calcium propionate of 0.1 percent, 0.5 percent, and 1.0 percent, based on the weight of the ground beef. All three samples retained the color rating of 9 through the first six days of the test period. The sample having calcium propionate at the level of 0.1 percent faded drastically to a color rating of 2 by the conclusion of the tenth day. The other two samples both had color ratings of 8 on the eleventh day and, in the instance of the 0.5 percent sample, a rating of 5 on the fourteenth day and the other sample a rating of 6 at the conclusion of the fourteenth day. Again it will be seen that the advantages to be obtained through the combined use of the ascorbic acid and propionate are to be recommended.

Example V

In this example a different batch of ground meat was used which was prepared in the manner and refrigerated as described above. Again the meat had an initial color rating of 9 and the untreated control at the conclusion of the fourth day was rated 8. This untreated control had gone off-color to 6 on the fifth day and steadily declined in color rating thereafter. Ascorbic acid was incorporated respectively in two other portions of the meat in an amount of 0.05 percent based on the weight of the meat. Sodium propionate was added to these two samples in levels of 0.2 percent and 0.5 percent, respectively. Both of these latter samples had a rating of 8 on the eighth day, and in the instance of the 0.2 percent sample, a rating of 7 on the eleventh day and 7— on the twelfth day. The other propionate sample (0.5%) retained a rating of 8 through the twelfth day, going off-color to a 6+ by the eighteenth day. The 0.2 percent propionate sample had a rating of 6 on the eighteenth day.

The following examples, VI–X, inclusive, were run on another batch of beef ground in the manner described above and to which the additives were again added in an aqueous solution. The same range of refrigeration temperatures was employed. This batch of ground beef had an initial color rating of 9, and the untreated control at the conclusion of the first day had gone off-color to a 6+. A sample treated solely with ascorbic acid at a level of 0.05 percent based on the weight of meat retained an acceptable color of 7 for three days, but by the fourth day it had faded to a color rating of 4.

Example VI

In the present sample N propyl propionate was added at a 0.5 percent level to the ground meat. At the conclusion of the first day the meat had a color rating of 8 and gradually faded to a rating of 6 by the conclusion of the fifth day. The sample remained at the rating of 6 through the sixth day and further faded to a rating of 5 for the seventh and eighth days.

Example VII

N propyl propionate was added at the same level as in the preceding sample, along with 0.05 percent ascorbic acid. This sample had a rating of 8 at the conclusion of the first day but had faded to 7 by the conclusion of the fifth day. The sample retained the color rating of 7 through the eighth day and on the ninth day dropped to 6.

Example VIII

This sample had N propyl propionate and the ascorbic acid incorporated at the same level as in the preceding Example VII, together with 0.2 percent monobasic sodium phosphate. This sample had a good color rating and at the conclusion of the eighth day was given a rating of 8 by the members of the color panel. The sample faded to a 7 on the ninth day and retained this latter rating through the twelfth day. This example demonstrates the advantage to be gained in the use of the phosphate.

Example IX

Iso propyl propionate was added to this sample in the amount of 0.5 percent based on the weight of the ground meat. This sample had a rating of 8 at the conclusion of the third day but had badly faded to a rating of 5 at the conclusion of the fifth day. However, this compares favorably to the untreated control which, as mentioned above, had gone off-color to a 6+ at the end of the first day and a rating of 2 by the fifth day.

Example X

In this sample iso propyl propionate was added in the amount of 0.5 percent and the ascorbic acid incorporated was in the amount of 0.05 percent, all based on the weight of the ground meat. This sample retained the color rating of 9 throughout the sixth day, dropping to 8 on the seventh day, which rating was retained through the ninth day. By the twelfth day the color had faded somewhat to a rating of 7.

In a third series of tests (Examples XI–XIII) ground beef was prepared in the manner described previously. As in the other tests, the meat was refrigerated at a temperate within the range of 33°–37° F. An untreated control which had the initial color rating of 9 had faded to a rating of 7 by the end of the second day. On the third day this sample had a rating of 6. A sample treated solely with 0.05 percent ascorbic acid retained a color rating of 9 through the third day and on the sixth day faded to a rating of 5.

Example XI

Ascorbic acid and sodium propionate were added to the present sample at the level of 0.05 percent and 0.1 percent, respectively. This sample retained a color rating of 9 through thirteen days and by the sixteenth day had faded to a rating of 6.

Example XII

Ascorbic acid and sodium propionate were added at the same levels as in the preceding example, along with 0.2 percent of monobasic sodium phosphate. The ground beef had a color rating of 9 through the thirteenth day and by the sixteenth day had faded to a rating of 8. It will be noted that the addition of this minor amount of sodium phosphate gave added protection over that obtained in Example XI.

Example XIII

In this sample sodium propionate and ascorbic acid were added at the same concentrations as in the preceding two examples, plus 0.2 percent of monobasic calcium phosphate. This sample retained a rating of 9 through the thirteenth day and faded to 8 by the sixteenth day.

Example XIV

The ground meat of this sample was prepared and refrigerated in the manner as described before. The meat had an initial color rating of 8. The untreated control retained this color rating through the first day but had by the conclusion of the second day faded to a rating of 6. A sample of this same meat was treated with 0.05 percent ascorbic acid, 0.05 percent sodium propionate, and 2.2 percent monobasic sodium phosphate. This sample retained the color rating of 8 through the ninth day and faded to a value of 6 by the twelfth day.

Example XV

The ground beef of this sample was prepared in the manner previously described and refrigerated at a temperature within the range of 33°–37° F. The meat had an initial color rating of 8. Two of the samples were treated with propionic acid in amounts of 0.05 percent and 0.2 percent, respectively, based on the weight of the meat. An untreated control containing neither propionic acid nor ascorbic acid at the end of the first day had a rating of 7 and by the second day had faded to an unacceptable color rating of 4. The untreated control on the sixth day was rated at 3. A third sample was treated with 0.1 percent propionic acid and 0.05 percent of ascorbic acid. The sample containing both propionic and ascorbic acid retained a color rating of 8 through the ninth day and had slightly faded to a 7 on the twelfth day. The color panel rated the sample at 6 on the thirteenth day. The sample containing propionic acid in the amount of 0.05 percent was rated at 7 at the end of the third day and on the fourth day was given a rating of 5. This sample further faded to a rating of 4 on the sixth day and on the ninth day was given a rating of 2. The sample containing the higher level of propionic acid was rated at 7 on the third day and 5 on the fourth day. On the sixth day the color panel gave a rating of 4 to the latter sample and the same rating on the eighth day.

Obviously, many modifications and variations of the invention as hereinbefore set forth may be made without departing from the spirit and scope thereof, and therefore only such limitations should be imposed as are indicated in the appended claims.

We claim:

1. In a process for improving the color of animal material having an oxygen carrying pigment, the step of treating said material with at least about .05%, by weight of said material, of a composition selected from the group consisting of propionic acid and its edible salts and esters, together with at least about .01%, by weight of said material, of a composition selected from the group consisting of ascorbic acid and its edible salts and esters, whereby a reaction pigment of bright red color is obtained.

2. In a process for improving the color of animal material having the color pigments of methemoglobin and metmyoglobin, the step of treating said material with at least about .01%, by weight of said material, of a composition selected from the group consisting of ascorbic acid and its edible salts and esters, and with at least about .05%, by weight of said material, of sodium propionate in the presence of oxygen, whereby the met pigments are substantially converted to oxyhemoglobin and oxymyoglobin.

3. In a process for improving the color of animal material having the color pigments of methemoglobin and metmyoglobin, the step of treating said material with at least about .01%, by weight of said material, of a composition selected from the group consisting of ascorbic acid and its edible salts and esters, and with at least about .05%, by weight of said material, of calcium propionate in the presence of oxygen, whereby the met pigments are substantially converted to oxyhemoglobin and oxymyoglobin.

4. In a process for improving the color of animal material having the color pigments of methemoglobin and metmyoglobin, the step of treating said material with at least about .01%, by weight of said material, of a composition selected from the group consisting of ascorbic acid and its edible salts and esters, and with at least about .05%, by weight of said material, of isopropyl propionate in the presence of oxygen, whereby the met pigments are substantially converted to oxyhemoglobin and oxymyoglobin.

5. In a process for improving the color of animal material having the color pigments of methemoglobin and metmyoglobin, the step of treating said material with at least about .01%, by weight of said material, of a composition selected from the group consisting of ascorbic acid and its edible salts and esters, and with at least about .05%, by weight of said material, of N propyl propionate in the presence of oxygen, whereby the met pigments are substantially converted to oxyhemoglobin and oxymyoglobin.

6. In a process for improving the color of animal material having an oxygen carrying pigment, the subjection of said material to treatment with at least about .01%, by weight of said material, of a composition selected from the group consisting of ascorbic acid and its edible salts and esters, and at least about .05%, by weight of said material, of a composition selected from a group consisting of propionic acid and its edible salts and esters, and at least about .2%, by weight of said material, of a monobasic alkaline earth phosphate to obtain an improved color of longer duration than that obtainable with the use of ascorbic acid alone.

7. A process as described in claim 6 wherein the monobasic alkaline earth phosphate is a monobasic calcium phosphate.

8. The process as described in claim 6 wherein the monobasic alkaline earth phosphate is a monobasic sodium phosphate.

9. In a process for improving the color of animal material having an oxygen carrying pigment, the step of treating said material with between about 0.05% and about 0.5%, by weight of said material, of a composition selected from the group consisting of propionic acid and its edible salts and esters, together with between about 0.01% and about 0.1%, by weight of said material, of a composition selected from the group consisting of ascorbic acid and its edible salts and esters, whereby a reaction pigment of bright red color is obtained.

10. In a process for improving the color of animal material having an oxygen carrying pigment, the step of treating said material with at least about .01%, by weight of said material, of a composition selected from the group consisting of propionic acid and its edible salts and esters, together with at least about .01%, by weight of said material, of a composition selected from the group consisting of ascorbic acid and its edible salts and esters, whereby a reaction pigment of bright red color is obtained.

References Cited in the file of this patent

UNITED STATES PATENTS

| | | |
|---|---|---|
| 2,117,478 | Hall | May 17, 1938 |
| 2,190,714 | Hoffman et al. | Feb. 20, 1940 |
| 2,541,572 | Coleman et al. | Feb. 13, 1951 |